United States Patent [19]

Steinmann

[11] Patent Number: 5,534,618
[45] Date of Patent: Jul. 9, 1996

[54] POLYETHERS CONTAINING HINDERED AMINES WHICH CAN BE CLEAVED OFF AS STABILIZERS

[75] Inventor: Alfred Steinmann, Praroman, Switzerland

[73] Assignee: Ciba-Geigy Corporation, Tarrytown, N.Y.

[21] Appl. No.: 271,703

[22] Filed: Jul. 7, 1994

[30] Foreign Application Priority Data

Jul. 13, 1993 [CH] Switzerland ............... 2100/93

[51] Int. Cl.$^6$ ................................. C08G 65/04
[52] U.S. Cl. ........................................ 528/419
[58] Field of Search .................... 528/423, 421, 528/419

[56] References Cited

U.S. PATENT DOCUMENTS

| | | | |
|---|---|---|---|
| 3,904,581 | 9/1975 | Murayama et al. | 524/102 |
| 4,460,725 | 7/1984 | Leistner et al. | 524/102 |
| 4,769,443 | 9/1988 | Cantatore | 528/423 |

FOREIGN PATENT DOCUMENTS

| | | |
|---|---|---|
| 0000769 | 2/1979 | European Pat. Off. . |
| 0001835 | 5/1979 | European Pat. Off. . |
| 001835 | 5/1979 | European Pat. Off. . |
| 0073386 | 3/1983 | European Pat. Off. . |
| 2349962 | 4/1974 | Germany . |
| 2352606 | 5/1974 | Germany . |
| 2365369 | 12/1974 | Germany . |

OTHER PUBLICATIONS

Chem. Abstr. 81, 170586K.
Chem. Abstr. 82, 18009n.
Chem. Abstr. 83, 60490h.

*Primary Examiner*—Kriellion S. Morgan
*Attorney, Agent, or Firm*—Michele A. Kovaleski; Luther A. R. Hall

[57] ABSTRACT

The invention relates to polyethers containing recurring units of the formula I $$\left[\begin{array}{c}CH_2-CH-O\\|\\CH_2\\|\\\underset{H_3C}{\overset{H_3C}{>}}\!\!\underset{H_3C}{\overset{}{\diagdown}}N\underset{CH_3}{\overset{CH_3}{\diagup}}\\\diagdown_E\diagup^A\end{array}\right] \quad (I)$$

in which A is —$CH_2$— or —CO—, and, when A is methylene, E is $$\underset{R^1}{\diagup}\overset{\diagdown}{\underset{}{C}}\underset{R^2}{\diagdown},$$

and when A is carbonyl, E is $$\diagdown N-R^{17};\diagup$$

$R^1$ is hydrogen, and $R^2$ is likewise hydrogen or an aromatic, aliphatic or araliphatic carbonyloxy radical or a corresponding radical of an ether or tertiary amine, or $R^1$ and $R^2$ together are a=O substituent or together with the carbon atom to which they are bonded are a five- or six-membered, substituted, oxygen- and/or nitrogen-containing heterocyclic ring, and $R^{17}$ is a hydrocarbon radical having a maximum of 18 carbon atoms.

The polyethers according to the invention can advantageously be employed for the stabilization of organic material against the harmful effect of light, oxygen and/or heat.

6 Claims, No Drawings

POLYETHERS CONTAINING HINDERED AMINES WHICH CAN BE CLEAVED OFF AS STABILIZERS

The invention relates to novel compounds which can be obtained by anionic polymerization of derivatives of 1-(2,3-epoxypropyl)-2,2,6,6-tetramethylpiperidine or copolymerization of these compounds with other epoxides, to their use as stabilizers for organic material against the harmful effect of light, oxygen and/or heat, and to the corresponding stabilized compositions.

A number of publications describe the use of N-glycidyl-substituted polyalkylpiperidines as stabilizers for polymers, including DE-A-2 352 606 (Chem. Abstr. 81, 170586k); DE-A-2 365 369 (Chem. Abstr. 82, 18009n); DE-A-2 349 962 (Chem. Abstr. 83, 60490h); U.S. Pat. No. 3,904,581 (Chem. Abstr. 84, 5991t); EP-A-73 386 (Chem. Abstr. 98, 199293z).

EP-A-001 835 describes the further reaction of epoxy group-containing piperidines with dicarboxylic anhydrides to give polyesters.

There is a continuing demand for novel polymeric light stabilizers having improved use properties which contain tetramethylpiperidine groups as side chains.

The invention therefore relates firstly to polyethers comprising 1–100 mol % of recurring units of the formula I

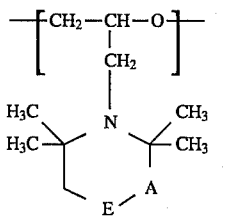

and 0–99 mol % of structural units of the formula II

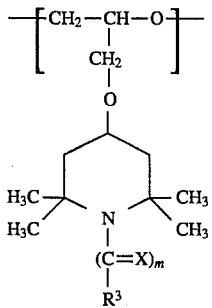

and/or of the formula III

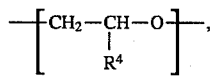

where the molecular weight $M_n$ of the homopolymer or copolymer, measured by gel permeation chromatography, is from 600 to 600,000 g/mol, and in which m is 0 or 1;

A is —CH$_2$— or —CO—;

when A is methylene, E is

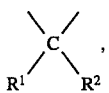

and when A is carbonyl, E is

$R^1$ is hydrogen;
$R^2$ is hydrogen; —O—$R^5$; —S—$R^5$; or —N($R^{13}$)$R^{14}$; or
$R^1$ and $R^2$ together are a =O substituent or together with the carbon atom to which they are bonded are a five- or six-membered ring of the formula

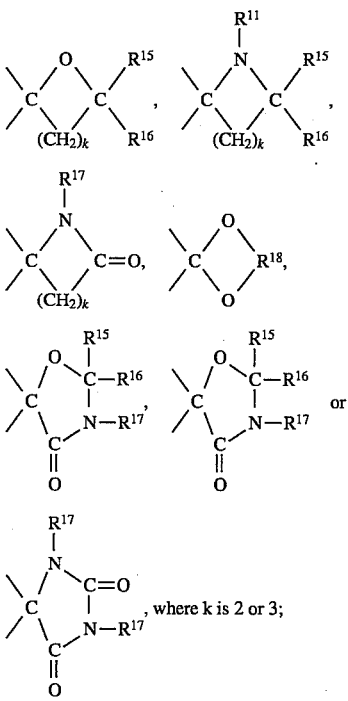

, where k is 2 or 3;

$R^3$, in the case where m is 0 or 1, is $C_1$–$C_{36}$alkyl or $C_7$–$C_{36}$aralkyl, each of which is unsubstituted or substituted by $C_5$–$C_8$cycloalkyl and/or is interrupted in the aliphatic part by $C_5$–$C_8$cycloalkylene and/or in the aliphatic part by oxygen or sulfur or —NR$^{11}$— and/or is substituted in the aromatic part by 1 to 3 $C_1$–$C_4$alkyl or $C_1$–$C_4$alkoxy radicals; $C_5$–$C_{12}$cycloalkyl which is unsubstituted or substituted by 1 to 4 $C_1$–$C_4$alkyl and/or $C_1$–$C_4$alkoxy radicals; $C_6$–$C_{10}$aryl which is unsubstituted or substituted by 1 to 4 $C_1$–$C_4$alkyl and/or $C_1$–$C_4$alkoxy radicals; and $R^3$, in the case where m is 0, can alternatively be hydrogen; $C_1$–$C_{36}$alkoxy or $C_7$–$C_{36}$aralkoxy, each of which is unsubstituted or substituted by $C_5$–$C_8$cycloalkyl and/or is interrupted in the aliphatic part by $C_5$–$C_8$cycloalkylene and/or in the aliphatic part by oxygen or sulfur or —NR$^{11}$— and/or is substituted in the aromatic part by 1 to 3 $C_1$–$C_4$alkyl or $C_1$–$C_4$alkoxy radicals; $C_5$–$C_{12}$cycloalkoxy which is unsubstituted or substituted by 1 to 4 $C_1$–$C_4$alkyl and/or $C_1$–$C_4$alkoxy radicals; or $C_6$–$C_{10}$aryloxy which is unsubstituted or substituted by 1 to 4 $C_1$–$C_4$alkyl and/or $C_1$–$C_4$alkoxy radicals;

$R^4$ is as defined below for $R^5$ or is —O—$R^5$, —CH$_2$—O—$R^5$ or hydrogen;

$R^5$ is $C_1$–$C_{50}$alkyl; or $C_2$–$C_{50}$alkyl which is interrupted by —O—, —S— and/or $C_5$–$C_8$cycloalkylene; or $R^5$ is $C_5$–$C_{12}$cycloalkyl which is unsubstituted or substituted by 1 to 4 —$R^{12}$; $C_6$–$C_{10}$aryl which is unsubstituted or substituted by 1 to 4 —$R^{12}$ or —O$R^{12}$; or $C_7$–$C_{50}$aralkyl which is unsubstituted or substituted by $C_5$–$C_8$cycloalkyl and/or is interrupted in the aliphatic part by $C_5$–$C_8$cycloalkylene and/or is interrupted in the aliphatic part by oxygen or sulfur and/or is substituted in the aromatic part by 1 to 4 —$R^{12}$ or —$OR^{12}$;

$R^{11}$ is $C_1$–$C_{18}$alkyl; $C_5$–$C_8$cycloalkyl; phenyl; naphthyl; $C_7$–$C_9$phenylalkyl; or $C_{11}$–$C_{14}$naphthylalkyl;

$R^{12}$ is $C_1$–$C_{18}$alkyl; $C_5$–$C_7$cycloalkyl; phenyl or benzyl;

$R^{13}$ and $R^4$, independently of one another, each have one of the meanings given for $R^5$; or $R^{13}$ and $R^{14}$, together with the nitrogen atom to which they are bonded, are cyclic imide of the formula

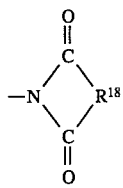

whose ring structure contains 4 to 6 carbon atoms;

$R^{15}$ and $R^{16}$, independently of one another, are H; or $C_1$–$C_{12}$alkyl; or together are straight-chain, $\alpha,\omega$-linked $C_4$–$C_{13}$alkylene;

$R^{17}$ has one of the meanings for $R^{11}$;

$R^{18}$ is $C_2$–$C_{18}$alkylene; and

X is an oxygen or sulfur atom.

Preference is given to polyethers consisting of recurring units of the formula I or to corresponding copolymers containing between 1 and 100 mol % of recurring units of the formula I, with the remaining structural units conforming to the formula II and/or to the formula III.

A is preferably methylene, and E is preferably

$R^5$ is particularly preferably a long-chain and/or sterically hindered radical, for example $C_6$–$C_{36}$alkyl; $C_6$–$C_{36}$alkyl which is interrupted by —O—; $C_5$–$C_9$cycloalkyl; phenyl; $C_7$–$C_{36}$phenylalkyl; or $C_7$–$C_{36}$phenylalkyl which is interrupted in the aliphatic part by —O—; $C_6$–$C_{18}$alkyl and $C_7$–$C_9$phenylalkyl are particularly preferred.

The structural units of the formulae I, II and III shown are constitutional repeating units. The polyethers according to the invention can comprise units in which the radicals each have the same meaning or can comprise different units of the formula I in which two or more of the meanings given for m, X and/or $R^1$ to $R^5$ have been achieved. The polyethers according to the invention preferably consist of identical units of the formula I, II or III; of particular importance are polyethers consisting of structural units of the formula I or II, in particular homopolymers consisting of units of the formula I.

The polyethers according to the invention can advantageously be employed for the stabilization of organic material against the harmful effect of light, oxygen and/or heat.

Examples of the meanings of $R^3$ include the following: branched or unbranched $C_1$–$C_{36}$alkyl such as methyl, ethyl, propyl, isopropyl, n-butyl, sec-butyl, isobutyl, t-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl, docosyl, pentacosyl and triacosyl; preferably unbranched $C_1$–$C_{18}$alkyl, in particular methyl; branched or unbranched $C_1$–$C_{36}$alkyloxy, in particular $C_6$–$C_{18}$alkoxy, such as hexyloxy, heptyloxy, octyloxy, nonyloxy, decyloxy, undecyloxy and dodecyloxy; $C_5$–$C_8$cycloalkyl-substituted alkyl or alkoxy, such as cyclopentylmethyl, cyclohexylmethyl, cycloheptylmethyl, cyclooctylmethyl, cyclohexylethyl, 2-cyclohexyl-n-propyl, 3-cyclohexyl-n-propyl and 4-cyclohexyl-n-butyl; alkyl or alkoxy which is interrupted by $C_5$–$C_8$cycloalkylene or —O—, for example of the formulae

—$C_2H_4$—O—$C_2H_4$—O—$C_{12}H_{25}$, —$(C_2H_4$—O$)_4$—$C_4H_9$, —$(C_2H_4$—O$)_6$—$C_4H_9$;

$C_5$–$C_8$cycloalkyl and $C_5$–$C_8$cycloalkoxy which are unsubstituted or alkyl-substituted, such as cyclopentyl, cyclopentoxy, cyclohexyl, cyclohexyloxy, cycloheptyl, cycloheptyloxy, cyclooctyl, cyclooctyloxy, 2- and 4-methylcyclohexyloxy, dimethylcyclohexyloxy, trimethylcyclohexyl, t-butylcyclohexyl, in particular cyclohexyl and cyclohexyloxy; phenyl, phenoxy; $C_1$–$C_4$alkyl-substituted phenyl and phenoxy; $C_7$–$C_{12}$phenylalkyl and $C_7$–$C_{12}$phenylalkoxy, in particular benzyl, benzoxy, phenethoxy, 3-phenylpropoxy, $\alpha$-methylbenzyl, $\alpha$-methylbenzoxy, $\alpha,\alpha$-dimethylbenzyl and $\alpha,\alpha$-dimethylbenzoxy.

In the case where m=0, preferred radicals $R^3$ are those whose free valence is localized on an oxygen atom or a saturated carbon atom.

$R^4$ and $R^5$ have, for example, the following meanings: methyl, ethyl, propyl, isopropyl, n-butyl, sec-butyl, isobutyl, t-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl, docosyl, pentacosyl, triacosyl, tetracontyl;

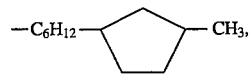

—$C_2H_4$—O—$C_2H_4$—O—$C_{12}H_{25}$, —$(C_2H_4$—O$)_4$—$C_4H_9$, —$(C_2H_4$—O$)_6$—$C_4H_9$; cyclopentyl, cyclohexyl, cycloheptyl, cyclooctyl, 2- and 4-methylcyclohexyl, 2- and 4-hydroxycyclohexyl, dimethylcyclohexyl, trimethylcyclohexyl, t-butylcyclohexyl; $C_6$–$C_{10}$aryl, such as phenyl and naphthyl; $C_1$–$C_4$alkyl -substituted phenyl; arylalkyl and substituted arylalkyl, such as benzyl, phenethyl, 3-phenylpropyl, $\alpha$-methylbenzyl, $\alpha,\alpha$-dimethylbenzyl, —$C_2H_4$—O—$C_2H_4$—O—$C_{12}H_{24}$—$C_6H_5$, —$(C_2H_4$—O$)_4$—$CH_2$—$C_6H_5$, —$(C_2H_4$—O$)_6$—$C_4H_8$—$C_6H_5$ and —$CH_2$—$C_6H_4$—$C(CH_3)_2$—$C_6H_5$.

Any $R^3$, $R^4$ and $R^5$ radicals containing alkyl which is interrupted by —O—, —S— or —$NR^{11}$— are alkyl having at least 2, preferably at least 4, carbon atoms which is preferably interrupted by 1–6 —O—, —S— or —$NR^{11}$— groups, in particular by 1–6 —O— groups; the hetero atoms are preferably bonded to carbon atoms and not to other hetero atoms, i.e. there are no structures of the —O—O— or —$NR^{11}$—$NR^{11}$— type. These radicals are particularly preferably polyoxyethylene chains whose ends are saturated by $C_1$–$C_8$alkyl.

The recurring units of the formula III are frequently derived from ethylene oxide or glycidyl compounds; $R^4$ is therefore preferably, in addition to the above radicals, also hydrogen or alkoxymethyl, such as ethoxymethyl, propoxymethyl, butoxymethyl, pentoxymethyl, hexyloxymethyl, heptyloxymethyl, octyloxymethyl, nonyloxymethyl, decyloxymethyl, undecyloxymethyl, dodecyloxymethyl, pentadecyloxymethyl and octadecyloxymethyl; $C_6$-$C_{10}$aryloxymethyl, for example phenoxymethyl; $C_7$-$C_{36}$aryloxymethyl, for example benzoxymethyl, α-methylbenzoxymethyl and β-phenylethoxymethyl; and $C_5$-$C_9$cycloalkoxymethyl, for example cyclohexyloxymethyl.

The polyethers according to the invention usually contain from 3 to 3000, preferably from 4 to 2000, in particular from 5 to 1000, units of the formulae I, II and/or III, of which at least 1 mol % are units of the formula I. Preference is given to polyethers containing at least 20 mol %, in particular 50–100 mol %, of units of the formula I. Polyethers consisting of 100% of units of the formula I are of particular interest. The number average molecular weight $M_n$ measured by gel permeation chromatography is generally from 600 to 600,000 g/mol, preferably from 800 to 400,000 g/mol, in particular from 1000 to 200,000 g/mol.

If the polyethers according to the invention contain units of the formula II and/or of the formula III, these are preferably either units of the formula II or units of the formula III. Also of particular interest are polyethers containing 1–20 mol %, in particular 1–10 mol %, of units of the formula II and 50–98 mol % of units of the formula III.

X in the formula II is preferably an oxygen atom; m is preferably the number 0.

The invention preferably relates to polyethers in which $R^3$, in the case where m is 0 or 1, is $C_1$-$C_{36}$alkyl; $C_2$-$C_{36}$alkyl which is interrupted by —O—; $C_7$-$C_{36}$aralkyl; $C_7$-$C_{36}$aralkyl which is interrupted in the aliphatic part by —O— and/or is substituted in the aromatic part by 1 to 3 $C_1$-$C_4$alkyl or $C_1$-$C_4$alkoxy radicals; $C_5$-$C_9$cycloalkyl which is unsubstituted or substituted by 1 to 3 $C_1$-$C_4$alkyl and/or $C_1$-$C_4$alkoxy radicals; or phenyl which is unsubstituted or substituted by 1 to 4 $C_1$-$C_4$alkyl and/or $C_1$-$C_4$alkoxy radicals; and $R^3$, in the case where m is 0, can alternatively be $C_1$-$C_{36}$alkoxy, $C_2$-$C_{36}$alkoxy which is interrupted by —O—; $C_7$-$C_{36}$aralkoxy; $C_7$-$C_{36}$aralkoxy which is interrupted in the aliphatic part by —O— and/or is substituted in the aromatic part by 1 to 3 $C_1$-$C_4$alkyl or $C_1$-$C_4$alkoxy radicals; $C_5$-$C_9$cycloalkoxy which is unsubstituted or substituted by 1 to 3 $C_1$-$C_4$alkyl and/or $C_1$-$C_4$alkoxy radicals; or phenoxy which is unsubstituted or substituted by 1 to 4 $C_1$-$C_4$alkyl and/or $C_1$-$C_4$alkoxy radicals;

$R^5$ is $C_1$-$C_{50}$alkyl; $C_2$-$C_{50}$alkyl which is interrupted by —O—; $C_5$-$C_9$cycloalkyl which is unsubstituted or substituted by —$R^{12}$; phenyl which is unsubstituted or substituted by 1 to 3 —$R^{12}$ or —$OR^{12}$; or $C_7$-$C_{50}$phenylalkyl which is unsubstituted or substituted in the aromatic part by 1 to 3 —$R^{12}$ or —$OR^{12}$ and/or is interrupted in the aliphatic pan by —O—; $R^{11}$ is $C_1$-$C_{18}$alkyl; $C_5$-$C_8$cycloalkyl; phenyl or $C_7$-$C_9$phenylalkyl; and X is an oxygen atom.

Of these, preferred polyethers are those in which
A is methylene and E is

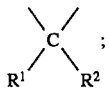

$R^1$ is hydrogen; and
$R^2$ is —O—$R^5$;
$R^3$, in the case where m is 0 or 1, is $C_1$-$C_{18}$alkyl or $C_7$-$C_{18}$phenylalkyl, each of which is unsubstituted or substituted on the phenyl ring by 1 to 3 $C_1$-$C_4$alkyl radicals; $C_5$-$C_9$cycloalkyl; or phenyl which is unsubstituted or substituted by 1 to 3 $C_1$-$C_4$alkyl radicals; and $R^3$, in the case where m is 0, can alternatively be $C_4$-$C_{36}$alkoxy or $C_7$-$C_{18}$phenylalkoxy, each of which is unsubstituted or substituted on the phenyl ting by 1 to 3 $C_1$-$C_4$alkyl radicals; $C_5$-$C_9$cycloalkoxy; or phenoxy which is unsubstituted or substituted by 1 to 3 $C_1$-$C_4$alkyl radicals; and $R^5$ is $C_6$-$C_{36}$alkyl; $C_6$-$C_{36}$alkyl which is interrupted by —O—; $C_5$-$C_9$ cycloalkyl; phenyl; $C_7$-$C_{36}$phenylalkyl; or $C_7$-$C_{36}$phenylalkyl which is interrupted in the aliphatic part by —O—.

The invention particularly relates to polyethers in which m is 0; and $R^5$ is $C_6$-$C_{18}$alkyl; $C_5$-$C_9$cycloalkyl; phenyl; or $C_7$-$C_9$phenylalkyl.

The polyethers according to the invention are expediently prepared by subjecting epoxides of the formula Ia

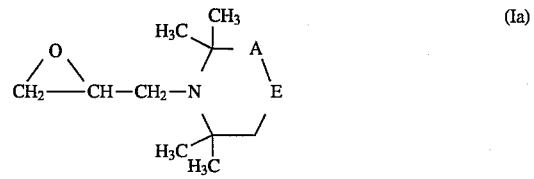

and, if desired, of the formula IIa

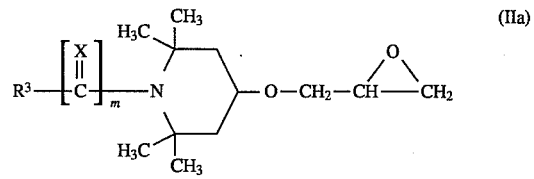

and/or of the formula IIIa

in which $R^1$ to $R^4$, X and m are as defined above, alone or as a mixture, to anionic polymerization in a manner known per se. The polymerization can be carded out, for example, by one of the methods described in the publication edited by K. C. Frisch and S. L. Reegen (Frisch/Reegen: Ring-Opening Polymerization, Marcel Dekker, New York 1969). The polymerization is generally initiated by one of the conventional initiators for anionic polymerization. These include basic organometallic compounds, such as Grignard compounds, for example of the $C_1$-$C_{12}$alkyl-Mg-Cl or $C_6$-$C_{12}$aryl-Mg-Cl type, alkyl alkali metal compounds, for example $C_1$-$C_6$alkyl alkali metal compounds, such as tert-butylpotassium, alkali metal alkoxides Me-OR', where Me is, for example, Li, Na or K, and R' is $C_1$-$C_6$alkyl, for example sodium methoxide, potassium methoxide, sodium tert-butoxide, potassium tert-butoxide, lithium ethoxide and sodium ethoxide, and hydroxides and amides, for example NaOH, KOH, sodium amide and lithium amide.

The initiator is expediently added in an amount of 0.1–10 mol %, preferably 1–5 mol %, based on the amount of epoxide.

A crown ether, such as 18-crown-6 or 15-crown-5, is preferably added to the mixture, expediently in an amount of 0.1–10 mol %, preferably 1–5 mol %, based on the amount of epoxide.

Polymerization is preferably carded out without solvent, but the use of a solvent is possible. The reaction temperature is not crucial, and generally ranges from 10° to 200° C.

Any solvent present must be inert under the reaction conditions. Examples of suitable solvents include aromatic and/or aliphatic hydrocarbons and ethers. Preference is given to high-boiling solvents, for example those whose boiling point at atmospheric pressure is in the range 80°–150° C. Examples of solvents which can be used are benzene, toluene, xylene, ethylbenzene, isopropylbenzene, cyclohexane, diethyl ether, dibutyl ether, tetrahydrofuran and dioxane.

The polymerization is expediently carded out with exclusion of oxygen, for example under argon or nitrogen, and with exclusion of water.

When the polymerization is complete, the products can be worked up by conventional methods. The mixture is expediently first diluted with a suitable solvent, for example tetrahydrofuran. The solution can be purified by filtration, if necessary after dispersion of activated charcoal. The polymer can be precipitated from the solution with the aid of a further solvent of suitable polarity, for example acetonitrile or a lower alcohol; this can be carded out by introducing the polymer solution into a larger amount of the precipitant. The purification by precipitation can be repeated a number of times if required.

The polymerization conditions selected determine which end groups are present in the polyethers of the formula I according to the invention. The terminal carbon atoms on the polyether chain can be saturated, for example, by —H or —OH or by a radical of the compound used as initiator. If the initiator employed is, for example, as described above an alkoxide R'O— and the work-up after the polymerization involves a protic solvent, the terminal groups —OR' and —OH can frequently occur on the terminal carbon atoms.

In principle, however, the type of terminal group is of minor importance for the action of the polyethers according to the invention as stabilizers.

A process for the preparation of a compound of the formula Ia starts from a piperidine compound of the formula Ib

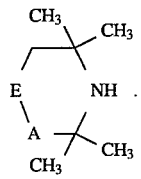

(Ib)

Piperidine compounds of this type are known, and some are commercially available.

For the preparation of a compound of the formula Ia, the piperidine compound of the formula Ib can be reacted with epichlorohydrin in a manner known per se with elimination of HCl.

The reaction can be carded out analogously to one of the methods described in EP-A-001 835 or in Luston and Vass, Makromol. Chem., Macromol. Symp., 27, 231 (1989). In an expedient procedure, an excess of epichlorohydrin is slowly added to the piperidine compound of the formula Ib in the presence of strong bases, for example aqueous concentrated alkali metal hydroxide solution. In addition, an organic solvent can be employed in the reaction.

The base is advantageously employed in an approximately 1.1–20-fold molar excess, based on the compound of the formula Ib; for example 1.1–15 mol, preferably 1.2–12 mol, of sodium hydroxide or potassium hydroxide as a 50% aqueous solution are used per mole of piperidine compound. Any organic solvent is expediently employed in such an amount that the compound of the formula Ib is dissolved completely; examples of suitable solvents are low-polarity to non-polar solvents such as hydrocarbons and ethers, preferably toluene.

For example, 1–4 equivalents, preferably 1.2–3 equivalents, in particular 1.5–2.5 equivalents, of epichlorohydrin can be employed per equivalent of the piperidine compound of the formula Ib. In addition, 1–30 mol %, preferably 5–25 mol %, of a tertiary amine salt, for example a tetraalkylammonium halide, such as tetramethylammonium chloride or tetrabutylammonium bromide, or of a phosphonium salt, for example a quaternary phosphonium halide, such as ethyltriphenylphosphonium bromide, can advantageously be added to the mixture as phase-transfer catalyst.

The temperature during the reaction can be in the range from 0° to 200° C., expediently from 20° to 160° C., in particular from 40°–140° C.

The temperature of the reaction mixture can be kept in the boiling range (reflux) for the duration of the reaction. To this end, a solvent-containing reaction mixture is warmed to the boiling point, generally under atmospheric pressure, and the evaporated solvent is condensed with the aid of a suitable condenser and fed back into the reaction mixture.

When the reaction is complete, the work-up can be carded out by conventional methods; the mixture is expediently first diluted with water, for example by transferring the reaction mixture into 1–4 times the volume of ice water, and the organic phase can subsequently be separated off directly or extracted, for example using ethyl acetate or ether. After the organic phase has been dried, the product can be isolated by removing the solvent. It is also possible to use further purification steps, for example washing with aqueous NaCl solution, dispersion of activated charcoal, filtration and/or distillation.

Compounds of the formula Ia can furthermore be obtained by oxidation of the corresponding N-allyl compounds using peracids, for example peracetic acid. The further conversion into the polyethers according to the invention can be carded out as described above.

A process for the preparation of a compound of the formula IIa starts from a piperidine compound of the formula IIb

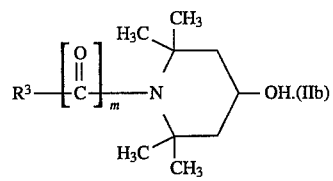

Piperidine compounds of this type are known, and some are commercially available.

For the preparation of a compound of the formula IIa, the piperidine compound of the formula IIb is expediently reacted with epichlorohydrin.

The epoxide of the formula IIa can be prepared correspondingly to or analogously to one of the methods described in EP-A-001 835 or in Luston and Vass, Makromol. Chem., Macromol. Symp. 27, 231 (1989). An excess of epichlorohydrin is expediently added slowly to the piperidine compound of the formula IIb in the presence of strong bases, for example aqueous concentrated alkali metal hydroxide solution, and in the presence of an organic solvent.

The base is advantageously employed in an approximately 2–20-fold molar excess, based on the compound of the formula IIb; for example 3–15 mol, preferably 4–12 mol, of sodium hydroxide or potassium hydroxide as a 50% aqueous solution are used per mole of piperidine compound. The amount of organic solvent employed is expediently such that the compound of the formula IIb is dissolved completely; examples of suitable solvents are low-polarity to non-polar solvents such as hydrocarbons or ethers, preferably toluene.

1–4 equivalents, preferably 1.2–3 equivalents, in particular 1.5–2.5 equivalents, of epichlorohydrin can be employed per equivalent of the piperidine compound of the formula IIb. In addition, 1–30 mol %, preferably 5–25 mol %, of a tertiary amine salt, for example a tetraalkylammonium halide, such as tetramethylammonium chloride or tetrabutylammonium bromide, or of a phosphonium salt, for example a quaternary phosphonium halide, such as ethyltriphenylphosphonium bromide, can advantageously be added to the mixture as catalyst.

The temperature during the reaction is expediently 0°–100° C., preferably 20°–80° C., in particular 30°–70° C.

The reaction is preferably carried out under a protective gas, for example nitrogen or argon; the reaction mixture is expediently stirred.

When the reaction is complete, the work-up can be carried out by conventional methods; the mixture is expediently first diluted with water, for example by transferring the reaction mixture into 1–4 times the volume of ice water, and the organic phase can subsequently be separated off directly or extracted, for example using ethyl acetate. After the organic phase has been dried, the product can be isolated by removing the solvent. It is also possible to use further purification steps, such as dispersion of activated charcoal, filtration or distillation.

The compounds of the formula IIIa are known.

The polyethers according to the invention are suitable for the stabilization of organic materials against thermal, oxidative or actinic degradation, for example for stabilization of the following organic polymers:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE), linear low density polyethylene (LLDPE), branched low density polyethylene (BLDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either $\pi$- or $\sigma$-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals beeing elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly($\alpha$-methylstyrene).

6. Copolymers of styrene or $\alpha$-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or $\alpha$-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with .the copolymers listed under 6), for example the copolymer mixtures known as ABS, MBS, ASA or AES polymers.

8. Halogen-containing polymers such as polychloroprene, chlorinated rubbers, chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides staring from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.

22. Drying and non-drying alkyl resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyl resins, polyester resins and acrylate resins crosslinked with melamine resins, urea resins, polyisocyanates or epoxy resins.

26. Crosslinked epoxy resins derived from polyepoxides, for example from bisglycidyl ethers or from cycloaliphatic diepoxides.

27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO.

The invention therefore furthermore relates to compositions comprising (a) an organic material which is sensitive to damage by light, oxygen and/or heat, in particular an organic polymer, and (b), as stabilizer, a polyether comprising recurring units of the formula I, and to the use of said polyethers for the stabilization of organic material, in particular organic polymers, against damage by light, oxygen and/or heat.

The invention likewise relates to a process for the stabilization of organic material, in particular organic polymers, against damage by light, oxygen and/or heat, which comprises admixing, as stabilizer, a polyether comprising recurring units of the formula I to the polymers.

Of particular interest is the use of the polyethers according to the invention as stabilizers for synthetic organic polymers, in particular thermoplastics, for example polyolefins.

The organic materials to be protected are preferably natural, semisynthetic or preferably synthetic organic polymers. Particular preference is given to synthetic organic polymers or mixtures of such polymers, in particular thermoplastics, such as polyolefins, especially polyethylene and polypropylene (PP). Other particularly preferred organic materials are photographic materials or coating compositions. The term photographic materials is taken to mean, in particular, the materials described in Research Disclosure 1990, 31429 (pages 474–480) for photographic reproduction and other reproduction methods. Coating compositions advantageously to be stabilized in the context of the invention are described, for example, in Ullmann's Encyclopedia of Industrial Chemistry, 5th Edn., Vol. A18, pp. 359–464, VCH Verlagsgesellschaft, Weinheim, 1991.

The invention therefore particularly preferably relates to compositions in which the component (a) to be protected is a polyolefin, a photographic material or a surface-coating binder based on acrylic, alkyd, polyurethane, polyester or polyamide resin or corresponding modified resins.

In general, the polyethers according to the invention are added to the material to be stabilized in amounts of from 0.01 to 10%, preferably from 0.01 to 5%, in particular from 0.01 to 2%, based on the total weight of the stabilized composition. The compounds according to the invention are particularly preferably employed in amounts of from 0.05 to 1.5%, in particular from 0.1 to 1.5%.

The recurring units of the formulae I and II preferably make up from 0.01 to 5%, in particular from 0.01 to 2%, especially from 0.05 to 1.5%, of the total weight of the stabilized composition.

The incorporation into the materials to be stabilized can be carried out, for example, by mixing or application of the polyethers according to the invention and any further additives by conventional methods. For example, the incorporation into the polymers to be protected can be carried out before or during moulding, or by application of the dissolved or dispersed compound to the polymer, if necessary with subsequent evaporation of the solvent. In the case of elastomers, these can also be stabilized as latices. Another method of incorporating the polyethers according to the invention comprises adding them before, during or directly after polymerization of the corresponding monomers or before the crosslinking. The polyethers according to the invention can be added as such or in encapsulated form (for example in waxes, oils or polymers). In the case of addition before or during the polymerization, the polyethers according to the invention can also act as regulators for the chain length of the polymers (chain terminators).

The polyethers according to the invention can also be added to the plastics to be stabilized in the form of a masterbatch, which contains this compound, for example, in a concentration of from 2.5 to 25% by weight.

The incorporation of the polymers or copolymers according to the invention can expediently be carried out by the following methods:

- as an emulsion or dispersion (for example to latices or emulsion polymers),
- as a dry mix during the mixing of additional components or polymer mixtures,
- by direct addition into the processing apparatus (for example extruder, internal mixer, etc.),
- as a solution or melt.

The polymer compositions according to the invention can be used in various forms or converted into various products, for example they can be used as or converted into films, sheets, fibres, tapes, moulding compositions, profiles or as binders for surface coatings, adhesives or adhesive cements.

In addition to the polymers or copolymers according to the invention, the compositions according to the invention can additionally contain conventional additives, for example those mentioned below.

The conventional additives are expediently employed in amounts of 0.1–10% by weight, for example 0.2–5% by weight, based on the polymer to be stabilized.

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-di-phenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis-(2,6-dimethyl-4-hydroxyphenyl) disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl) phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl) butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy2-methylphenyl)pentane.

1.7. O—, N— and S-benzyl compounds, for example 3,5,3',5'-tetra-tert-butyl-4,4'-dihydroxydibenzyl ether, octadecyl-4-hydroxy-3,5-dimethylbenzylmercaptoacetate, tris-(3,5-di-tert-butyl-4-hydroxybenzyl) amine, bis(4-tert-butyl-3-hydroxy-2,6-dimethylbenzyl)dithioterephthalate, bis(3,5-di-tert-butyl-4-hydroxybenzyl)sulfide, isooctyl-3,5di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2, 4,6-trimethylbenzene, 1,4-bis(3,5-di-tert-butyl-4-hydroxybenzyl)-2,3,5,6tetramethylbenzene, 2,4,6-tris(3,5-di-tert-butyl-4-hydroxybenzyl)phenol.

1.10. Triazine Compounds, for example 2,4-bis(octylmercapto)-6-(3,5-di-tert-butyl-4-hydroxyanilino)-1, 3,5-triazine, 2-octylmercapto-4,6-bis(3,5-di-tert-butyl-4-hydroxyanilino)-1, 3,5-triazine, 2-octylmercapto-4,6-bis(3,5-di-tert-butyl-4-hydroxyphenoxy)-1, 3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4, 6-tris(3,5-di-tert-butyl-4-hydroxyphenylethyl)-1,3,5-triazine, 1,3,5-tris(3,5-di-tert-butyl-4-hydroxyphenylpropionyl)- hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl- 4-hydroxybenzylphosphonate, dioctadecyl-5-tert-butyl-4-hydroxy3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β(5-tert-butyl-4-hydroxy-3-methylphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tert-butyl- 4-hydroxyphenylpropionyl)hexamethylenediamine, N,N'-bis(3,5-di-tert-butyl- 4-hydroxyphenylpropionyl)trimethylenediamine, N,N'-bis(3,5-di-tert-butyl-4-hydroxyphenylpropionyl)hydrazine.

2. UV absorbers and light stabilisers 2.1.2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl) benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl- 2'-hydroxy-5'-methylphenyl)-5-chloro-benzotriazole, 2-(3'-sec-butyl-5 '-tert-butyl-2'-hydroxyphenyl) benzotriazole, 2-(2'-hydroxy-4'-octyloxyphenyl)benzotriazole, 2-(3', 5'-di-tert-amyl- 2'-hydroxyphenyl)benzotriazole, 2-(3',5'-bis-(α,α-dimethylbenzyl)-2'-hydroxyphenyl)benzotriazole, mixture of 2-(3'-tert-butyl-2'-hydroxy-5'-(2-octyloxycarbonylethyl) phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)-benzotriazole, 2-(3'-tert-butyl-5'-[2-(2-ethylhexyloxy)carbonylethyl]- 2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]- 2H-benzotriazole with polyethylene glycol 300; [R—CH$_2$CH$_2$—COO(CH$_2$)$_3$]$_2$—, where R=3'-tert-butyl-4'-hydroxy-5'-2H-benzotriazol-2-ylphenyl.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutylphenyl salicylate, phenyl salicylate, octylphenyl salicylate, dibenzoyl resorcinol, bis(4-tert-butylbenzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethylpiperidyl)sebacate, bis(2,2,6,6-tetramethyl-piperidyl)succinate, bis( 1,2,2,6,6-pentamethylpiperidyl)sebacate, his(1,2,2,6,6-pentamethylpiperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4- piperidyl)-1,2,3,4-butane-tetracarboxylate, 1,1'-(1,2-ethanediyl)bis(3,3,5,5-tetramethylpiperazinone ), 4-benzoyl-2,2,6,6-tetramethylpiperidine, 4-stearyloxy-2,2, 6,6-tetramethylpiperidine, bis(1,2,2,6,6-pentamethylpiperidyl)- 2-n-butyl-2-(2-hydroxy-3,5-di-tert-butylbenzyl)malonate, 3-n-octyl- 7,7,9,9-tetramethyl-1,3,8-triazasprio[4.5] decan-2,4-dion, bis(1-octyloxy-2,2,6,6-tetramethylpiperidyl) sebacate, bis(1-octyloxy-2,2,6,6-tetramethylpiperidyl)succinate, the condensate of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butyl-amino-2,2,6, 6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1, 3,5-triazine and 1,2-bis-(3-aminopropylamino)ethane, 8-acetyl-3-dodecyl-7,7,9,9-tetramethyl-1,3, 8-triazaspiro[4.5]decane-2,4-dione, 3-dodecyl-1-(2,2,6,6-tetramethyl-4-piperidyl)pyrrolidin-2, 5-dione, 3-dodecyl- 1-(1,2,2,6,6-pentamethyl-4-piperidyl)pyrrolidine-2,5-dione.

2.7. Oxamides, for example 4,4'-dioctyloxyoxanilide, 2,2'-diethoxyoxanilide, 2,2'-dioctyloxy-5, 5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide and mixtures of ortho- and para-methoxy-disubstituted oxanilides and mixtures of o- and p-ethoxy-disubstituted oxanilides.

2.8.2-(2-Hydroxyphenyl)-1,3,5-triazines, for example 2,4,6-tris(2-hydroxy-4-octyloxyphenyl)-1, 3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)- 1,3,5-triazine, 2,4-bis(2-hydroxy-4-propyloxyphenyl)-6-(2,4-dimethylphenyl)-1,3,5-triazine, 2-(2-hydroxy- 4-octyloxyphenyl)-4, 6-bis(4-methylphenyl)-1,3, 5-triazine, 2-(2-hydroxy-4-dodecyloxyphenyl)-4, 6-bis(2,4-dimethylphenyl)-1,3,5-triazine, 2-[2-hydroxy-4-(2hydroxy-3-butyloxy-propoxy)phenyl ]-4, 6-bis(2,4-dimethyl)-1,3,5-triazine, 2-[2-hydroxy-4-(2-hydroxy-3-octyloxy-propyloxy)phenyl ]-4,6-bis(2,4-dimethyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4, 6-tris(tert-butylphenyl)pentaerythritol diphsophite, tristearyl sorbitol triphosphite, tetrakis(2,4-di-tert-butylphenyl) 4,4'-biphenylene diphosphonite, 6-isooctyloxy-2, 4,8,10-tetra-tert-butyl-12H-dibenz[d,g]-1,3,2-dioxaphosphocin, 6-fluoro-2,4,8, 10-tetra-tert-butyl-12-methyl-dibenz[d,g]-1, 3, 2-dioxaphosphocin, bis(2,4-di-tert-butyl-6-methylphenyl)-methylphosphite bis(2,4-di-tert-butyl-6-methylphenyl)ethylphosphite.

5. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto )propionate.

6. Polyamide stabilisers, for example, copper salts in combination with iodides and/or phosphorus compounds and salts of divalent manganese.

7. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmirate, antimony pyrocatecholate or tin pyrocatecholate.

8. Nucleating agents, for example, 4-tert-butylbenzoic acid, adipic acid, diphenylacetic acid.

9. Fillers and reinforcing agents, for example, calcium carbonate, silicates, glass fibres, asbestos, talc, kaolin, mica, barium sulfate, metal oxides and hydroxides, carbon black, graphite.

10. Other additives, for example, plasticisers, lubricants, emulsifiers, pigments, optical brighteners, flameproofing agents, antistatic agents and blowing agents.

11. Benzofuranones and indolinones, for example those disclosed in U.S. Pat. Nos. 4,325,863, 4,338,244, 5,175,312, 5,216,052, 5,252,643, DE-A-4 316 611, DE-A-4 316 622, DE-A-4 316 876, EP-A-0 589 839 or EP-A-0 591 102 or 3-[4-(2-acetoxyethoxy)phenyl ]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one ], 5,7-di-tert-butyl-3-(4-ethoxyphenyl)benzofuran-2-one, 3-(4-acetoxy-3, 5-dimethylphenyl)-5,7-di-tert-butyl-benzofuran-2-one, 3-(3,5-dimethyl-4-pivaloyloxyphenyl)-5, 7-di-tert-butyl-benzofuran-2-one.

The examples below illustrate the invention in greater detail. All parts and percentages, whether in the examples, in the remainder of the description or in the claims, are by weight, unless specified otherwise. The following abbreviations are used in the examples:

GC: gas chromatography
GPC: gel permeation chromatography
DSC: differential scanning calorimetry
THF: tetrahydrofuran
$M_n$: number average molecular weight (unit g/tool)
$M_w$: weight average molecular weight (unit g/tool)
$T_G$: glass transition temperature
Preparation Examples
A) Preparation of the monomers
A1) Preparation of 1-(2,3-epoxypropyl)-4-octyloxy-2,2, 6,6-tetramethylpiperidine
A1a) 4-Octyloxy-2,2,6,6-tetramethylpiperidine
314.6 g (2 mol) of 4-hydroxy-2,2,6,6-tetramethylpiperidine, 1400 ml of toluene, 100 g of polyethylene glycol 1000 and 561 g (10 mol) of powdered potassium hydroxide are introduced into a 2.5 l sulfonation flask fired with glass stirrer, condenser, thermometer and dropping funnel. The mixture is warmed to 80° C., during which the suspension is converted into a solution. 424.8 g (2.2 mol) of 1-bromooctane are subsequently added dropwise over the course of one hour, and the mixture is stirred at 80° C. for 12 hours, then cooled to 30° C. and poured onto ice.

After the mixture has been extracted with ethyl acetate, the organic phase is washed twice with water, dried over sodium sulfate and evaporated. The residue is distilled at 120° C./0.02 mmHg, giving 308 g of a clear liquid, purity (GC)>97%.

| Microanalysis | | |
|---|---|---|
| | calculated | found |
| % C | 75.77 | 75.66 |
| % H | 13.09 | 13.38 |
| % N | 5.19 | 4.81 |
| % Br | 0.00 | 0.00 |

$^1$H-NMR (CDCl$_3$):
0.79–1.05 ppm (5 H,m): CH$_3$—CH$_2$—
1.14 and 1.18 ppm (12 H, s): CH$_3$ (piperidine)
1.23–1.39 ppm (10 H, m): —(CH$_2$)$_5$—

| 1.54–1.58 ppm | (2 H, m) | } : CH$_2$ (piperidine) |
| 1.93–1.99 ppm | (2 H, m) | |

3.44–3.48 ppm (2H,t):—O—CH$_2$(octyl radical)
3.61–3.70 ppm (1H,m):CH(piperidine)

A1b) 1-(2,3-Epoxypropyl)-4-octyloxy-2,2,6,6-tetramethylpiperidine 269.5 g (1 mol) of the substance prepared under A1a), 1100 ml of epichlorohydrin and 11 g of tetramethylammonium chloride are introduced into a 1.5 l sulfonation flask fitted with condenser, glass stirrer, dropping funnel and thermometer. A solution of 48 g (1.2 mol) of sodium hydroxide and 48 ml of water is introduced into the dropping funnel. The flask contents are warmed to 100° C., and the sodium hydroxide solution is added dropwise over the course of 30 minutes. The mixture is then stirred at 130° C. for 16 hours, cooled, poured into ice water and extracted with diethyl ether. The organic phase is washed three times with sodium chloride solution, dried over sodium sulfate and evaporated under reduced pressure at 60° C. in a rotary evaporator. The residue is distilled over a Vigreux column: boiling point 136° C. at 0.02 mmHg. 238 g (73%) of a clear liquid are obtained.

| Microanalysis | | |
|---|---|---|
| | calculated | found |
| % C | 73.79 | 73.60 |
| % H | 12.08 | 12.25 |
| % N | 4.30 | 4.35 |

$^1$H-NMR (CDCl$_3$):
0.85–0.90 ppm (3 H,m): CH$_3$ (octyl ether)
1.01, 1.11, 1.20 ppm (12 H, s): CH$_3$ (piperidine)
1.28–1.38 ppm (12 H, m): —(CH$_2$)$_6$—

| 1.45–1.56 ppm | (2 H, m) | } : CH$_2$ (piperidine) |
| 1.82–1.89 ppm | (2 H, m) | |

2.50–2.91 ppm (5H,m):

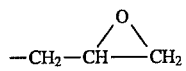

3.42–3.46 ppm (2H),t:—O—CH$_2$(octyl ether)
3.50–3.60 ppm (1H,m:CH(piperidine)

A2) Preparation of 1-(2,3-epoxypropyl)-4-benzyloxy-2,2,6,6-tetramethylpiperidine A2a) Preparation of 4-benzyloxy-2,2,6,6-tetramethylpiperidine 471.9 g (3 mol) of 4-hydroxy-2,2,6,6-tetramethylpiperidine, 2.1 l of toluene, 150 g of polyethylene glycol 1000 and 841.5 g (15 mol) of powdered potassium hydroxide are introduced into a 5 l flask with plane ground joints and fitted with anchor stirrer, thermometer, condenser and dropping funnel. The mixture is warmed to 80° C. 564.3 g (3.3 mol) of benzyl bromide are added dropwise to the solution over the course of 1 hour. After 24 hours at 80° C., the mixture is allowed to cool and is poured into ice water. The organic phase is separated off and extracted three times with 10% hydrochloric acid. The water phase is basified using 10% sodium hydroxide solution and is extracted three times with ethyl acetate. The ethyl acetate phases are combined and subsequently dried and evaporated. The residue is distilled at 90° C./0.01 mmHg, giving 487 g (66% ) of a clear liquid which crystallizes on cooling. A sample is recrystallized from n-hexane; melting point 30° C.

| Microanalysis | | |
|---|---|---|
| | calculated | found |
| % C | 77.68 | 77.52 |
| % H | 10.19 | 10.29 |
| % N | 5.66 | 5.60 |

$^1$H-NMR (CDCl$_3$):
0.71 ppm (1 H,s):NH

| 1.05–1.13 ppm | } (4 H, m) : CH$_2$ (piperidine) |
| 1.99–2.05 ppm | |

1.15 ppm and 1,17 ppm (12 H, s): CH$_3$
3.76–3.86 ppm (1 H, m): CH
7.26–7.35 ppm (5 H, m): aromatic A2b) Preparation of 1-(2,3-epoxypropyl)-4-benzyloxy-2,6,6-tetramethylpiperidine 400 ml of epichlorohydrin, 100 g of the substance prepared under A2a) and 5 g of tetramethylammonium chloride are introduced into a 1.5 l sulfonation flask fitted with thermometer, glass stirrer and dropping funnel. The mixture is heated to 100° C., and the solution of 18 g (450 mmol) of sodium hydroxide, dissolved in 18 g of water, is added dropwise over the course of 30 minutes. The mixture is then heated to 117° C. and stirred for 15 hours. The mixture is cooled, poured onto ice and extracted with diethyl ether. The organic phase is washed with sodium chloride solution, dried and evaporated. The residue is distilled over an isolated Vigreux column, giving 82 g (67%) of a clear liquid which boils at 130° C./0.01 mmHg.

| Microanalysis | | |
|---|---|---|
| | calculated | found |
| % C | 75.21 | 74.14 |
| % H | 9.63 | 9.78 |
| % N | 4.62 | 4.43 |

$^1$H-NMR (CDCl$_3$):
0.99 ppm, 1.11 ppm and 1,20 ppm ( 12 H,m): CH$_3$

| 1.40–1.48 ppm | } (4 H, m) CH$_2$ (piperidine) |
| 1.88–1.95 ppm | |

2.51–2.57 ppm, 2.69–2.71 ppm, 2.87–2.91 ppm (5 H,m):

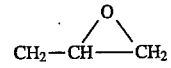

3.63–3.76 ppm (1 H, m): CH (piperidine)
4.55 ppm (2 H, s): O—CH$_2$—aromatic 7,25–7,43 ppm (5 H, m): aromatic A3) Preparation of 1-(2,3-epoxypropyl)-4-dodecyloxy-2,2,6,6-tetramethylpiperidine A3a) Preparation of 4-dodecyloxy-2,2,6,6-tetramethylpiperidine 201 g (1.28 mol) of 4-hydroxy-2,2,6,6-tetramethylpiperidine, 21.7 g (64 mmol) of tetrabutylammonium hydrogensulfate, 1.3 l of toluene and 256 g of sodium hydroxide (dissolved in 256 g of water) are introduced into a 2.5 l sulfonation flask fitted with glass stirrer, thermometer, dropping funnel and condenser. The mixture is warmed to 65° C., and 350 g (1.4 mol) of 1-bromododecane are added dropwise over the course of 1.5 hours. The mixture is then stirred for 15 hours under reflux, cooled to room temperature and poured onto ice, the organic phase is washed with water and dried over sodium sulfate, and the solvent is removed on a rotary evaporator. The residue is distilled at $8.10^{-3}$ mmHg over a Vigreux column, giving 150 g (36%) of a clear liquid having the boiling point 124°–126° C.

| Microanalysis | calculated | found |
|---|---|---|
| % C | 77.46 | 77.51 |
| % H | 13.31 | 13.43 |
| % N | 4.31 | 3.89 |

$^1$H-NMR (CDCl$_3$):
0.7 ppm (1 H,s): NH
0.850,94 ppm (3 H, t): CH$_3$ (dodecyl ether)
1.14–1.19 ppm (12 H, s): CH$_3$ (piperidine)
1.19–1.28 ppm (10 H, m): (CH$_2$)$_{10}$ (dodecyl ether)
1.53–1.58 ppm and 1.93–1.99 ppm (4 H, m): CH$_2$ (piperidine)
3.44–3.49 ppm (2 H, t): O—CH$_2$ (dodecyl ether)
3.61–3.70 ppm (1 H, m): CH (piperidine)

A3b) 1-(2,3-Epoxypropyl)-4-dodecyloxy-2,2,6,6-tetramethylpiperidine 132 g (0.41 mol) of the compound prepared under A3a), 400 ml of epichlorohydrin and 5 g of tetramethylammonium chloride are introduced into a 1.5 l sulfonation flask fitted with condenser, glass stirrer, thermometer, dropping funnel and nitrogen balloon, and are heated to reflux. 17.8 g (0.45 mol) of sodium hydroxide, dissolved in 17.8 g of water, are then added dropwise over the course of 30 minutes to the well-stirred mixture. The mixture is refluxed for 20 hours and then cooled to 30° C. The mixture is poured into ice water and extracted twice with diethyl ether. The organic phase is washed with saturated sodium chloride solution, dried over sodium sulfate and evaporated. The residue is purified over a silica gel column (hexane/ethyl acetate=4:1). Yield 119 g (76%).

| Microanalysis | calculated | found |
|---|---|---|
| % C | 75.53 | 75.71 |
| % H | 12.41 | 12.70 |
| % N | 3.67 | 3.54 |

$^1$H-NMR (CDCl$_3$):
0.86–0.90 (3 H,t):
1.01, 1.11, 1.20 ppm (12 H, d, s): CH$_3$ (piperidine)
1.22–1.38 ppm (20 H, m): –(CH$_2$)$_{10}$(dodecyl ether)
1.51–1.58 and 1.82–1.89 ppm (4 H, m): CH$_2$ (piperidine)
2.50–2.58 ppm (2 H, m): CH$_2$ (epoxide ring)
2.70–2.79 ppm (2 H, m): CH$_2$ (epoxide)
2.88–2.90 ppm (1 H, m): CH (epoxide ring)
3.42–3.46 ppm (2 H, t): —O—CH$_2$(dodecyl ether)

B) Preparation of the polyethers

B1) Poly[1-(2,3-epoxypropoxy)-4-benzyloxy-2,2,6,6-tetramethylpiperidine]

15 g (49.4 mmol) of the epoxide prepared under A2), 221 mg (1.98 mmol) of potassium tert-butoxide and 221 mg (0.84 mmol) of 18-crown-6 are introduced into a glass ampoule with magnetic stirrer. The mixture is allowed to polymerize under argon for 17 hours at 150° C. The solid formed is dissolved in THF and precipitated in methanol. The residue is re-dissolved in THF and precipitated in methanol. The residue is then dried under a high vacuum, giving 6.9 g (46%) of colourless solid.

| Microanalysis | calculated | found |
|---|---|---|
| % C | 75.21 | 74.94 |
| % H | 9.63 | 9.64 |
| % N | 4.62 | 4.48 |

$^1$H-NMR(CDCl$_3$):
0.99–1.18 ppm (12 H, m): CH$_3$ (piperidine)
1.40–1.43 ppm and 1.86–1.89 ppm (4 H, m): CH$_2$ (piperidine)
2.59 ppm (2 H, s): N—CH$_2$—
3.43 and 3.61 ppm (4 H, m): CH (piperidine) and

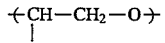

4.52 ppm (2 H, s): O—CH$_2$-aromatic
7.25–7.47 ppm (5 H, m): aromatic

GPC (THF): $M_n = 2365$, $M_w = 3401$ } $M_w/M_n = 1.44$

TGA (20° C./min, N$_2$): 5% weight loss at 340° C.

B2) Poly[1-(2,3-epoxypropyl)-4-dodecyloxy-2,2,6,6-tetramethylpiperidine]

15 g (39.6 mmol) of the epoxide prepared under A3), 177 mg (1.58 mmol) of potassium tert-butoxide and 177 mg (0.67 mmol) of 18-crown-6 are introduced into a 20 ml ampoule. The mixture is allowed to polymerize under argon for 15 hours at 150° C. The solid is taken up in THF and precipitated in acetonitrile. After re-dissolution in THF and precipitation in acetonitrile, 8.7 g (58%) of a yellowish solid are obtained after drying under a high vacuum.

| Microanalysis | calculated | found |
|---|---|---|
| % C | 75.53 | 75.24 |
| % H | 12.41 | 12.46 |
| % N | 3.67 | 3.51 |

$^1$H-NMR (CDCl$_3$): no epoxide proton signals visible

GPC (THF): $M_n = 2484$, $M_w = 3795$ } $M_w/M_n = 1.53$

TGA (20° C./min, N$_2$): 5% weight loss at 330° C.

B3) Poly[1-(2,3-epoxypropyl)-4-octyloxy-2,2,6,6-tetramethylpiperidine]

60 g (184 mmol) of the epoxide prepared under A1), 826 mg (7.4 mmol) of potassium tert-butoxide and 826 mg of 18-crown-6 are introduced into a 100 ml round-bottom flask with magnetic stirrer. The mixture is allowed to polymerize under argon for 15 hours at 150° C. The cooled solid is dissolved in diethyl ether, treated with activated charcoal, filtered and precipitated in ten times the amount of acetonitrile. After re-dissolution in diethyl ether, discoloration and precipitation in acetonitrile, 38 g (63%) of product are obtained as a highly viscous oil.

| | Microanalysis | |
|---|---|---|
| | calculated | found |
| % C | 73.79 | 73.57 |
| % H | 12.08 | 12.11 |
| % N | 4.30 | 4.23 |

GPC (THF): $M_n$=2400
$M_w$=3500
TGA (20° C./min, $N_2$): 5% weight loss at 320° C.

B4) Copolymer of 1,2,2,6,6-pentamethyl-4-(2,3-epoxypropoxy)piperidine and 1-(2,3-epoxypropyl)-4-benzyloxy-2,2,6,6-tetramethylpiperidine B4a) Preparation of 1,2,2,6,6-pentamethyl-4-(2,3-epoxypropoxy)piperidine 300 g (7.5 mol) of sodium hydroxide are dissolved in 300 g of water under an argon atmosphere in a 2.5 l sulfonation flask fitted with mechanical stirrer, condenser and 500 ml dropping funnel. 750 ml of toluene, 48.4 g (0.15 mol) of tetrabutylammonium bromide and 257 g (1.5 mol) of 4-hydroxy-1,2,2,6,6-pentamethylpiperidine are added. 347 g of epichlorohydrin (3.75 mol) are added dropwise at 60° C. over the course of 1.5 hours, and the mixture is subsequently stirred at the same temperature for a further 4 hours. The reaction solution is poured into 3 l of ice water, and the organic phase is separated off, dried over sodium sulfate and evaporated. The mixture is distilled over a Vigreux column at 0.05 mmHg, and the fraction of boiling point 71°–72° is collected. Yield: 205 g (60%). GC:>99%.

| | Microanalysis | |
|---|---|---|
| | calculated | found |
| % C | 68.68 | 68.64 |
| % H | 11.07 | 11.21 |
| % N | 6.16 | 6.32 |
| % Cl | 0.0 | 0.0 |

$^1$H-NMR (CDCl$_3$):
1.02 and 1.16 ppm (12 H,s): CH$_3$ groups of the piperidine ring
1.32–1.4 ppm and 1.83–1.91 ppm (4 H, m): —CH$_2$— groups of the piperidine ring
2.23 ppm (3 H, s): N—CH$_3$
2.60–2.62 ppm and 2.78–2.82 ppm (2 H, m): CH$_2$ group of the epoxide ring
3.42–3.47 ppm and 3.71–3.76 ppm (2 H, m): O—CH$_2$ group
3.57–3.67 ppm (1 H, m): CH—O of the piperidine ring B4b) Preparation of the copolymer 36.4 g (0.12 mol) of the product from A2b, 27.3 g (0.12 mol) of the product from B4a, 538 mg (4.8 mmol) of potassium tert-butoxide and 538 mg of 18-crown-6 are introduced into a 100 ml round-bottom flask. The solution is polymerized under argon for 22 hours at 150° C. The reaction product is dissolved in THF and precipitated in acetonitrile. This re-precipitation is repeated. The polymer is dried under a high vacuum, giving 11.8 g of the copolymer B4 in the title.

| | Microanalysis | |
|---|---|---|
| | calculated | found |
| % C | 70.95 | 70.83 |
| % H | 10.58 | 10.57 |
| % N | 5.62 | 5.50 |

$^1$H-NMR (CDCl$_3$):
N—CH$_3$ (2,22 ppm): aromatic (7.26–7.33 ppm)=2.5:1
DSC (10° C./min): $T_G$=21° C.
GPC (THF): $M_n$=1700; $M_w$=2800.

C) Use Examples

Example C1: Light stabilization of polypropylene fibres 2.5 g of the stabilizer according to the invention together with 1 g of Tris(2,4-di-tert-butylphenyl) phosphite, 1 g of calcium monoethyl 3,5-di-tert-butyl-4,hydroxybenzyl phosphonate, 1 g of calcium stearate and 2.5 g of TiO$_2$ (Kronos RN 57), is mixed with 1000 g of polypropylene powder (melt flow index 12 g/10 min, measured at 230° C./2.16 kg) in a turbo mixer.

The mixtures are extruded at 200°–230° C. to give granules; these are subsequently converted into fibres using a pilot plant (Leonard; Sumirago/VA, Italy) under the following conditions:

Extruder temperature: 200°–230° C.

Die head temperature: 255°–260° C.

Stretch ratio: 1:3.5

Stretch temperature: 100° C.

Fibres: 10 den

The fibres produced in this way are exposed against a white background in a Weather-O-Meter Type 65WR with a black panel temperature of 63° C. in accordance with ASTM D 2565-85. After various exposure times, the residual tensile strength of the samples is measured. The measurement values are used to calculate the exposure time $T_{50}$ after which the tensile strength of the samples is only half as much.

For comparative purposes, fibres containing no stabilizer according to the invention are produced and tested under otherwise identical conditions. The results are shown in Table C1 below. The amount data are based on the weight of the polypropylene employed.

TABLE C1

| Exposure duration ($T_{50}$/(h) for the tensile strength to half | |
|---|---|
| Stabilizer | $T_{50}$ |
| none | 300 h |
| From Example B1 | 1400 h |
| From Example B2 | 1310 h |
| From Example B3 | 1400 h |

The fibres stabilized according to the invention have excellent tenacity.

Example C2: Stabilization of a two-coat finish

The light stabilizers are incorporated in 5–10 g of xylene and tested in a varnish of the following composition:

| | |
|---|---|
| Synthacryl ® SC 303[1] | 27.51 |
| Synthacryl ® SC 370[2] | 23.34 |
| Maprenal ® MF 650[3] | 27.29 |
| Butyl acetate/butanol (37/8) | 4.33 |
| Isobutanol | 4.87 |
| Solvesso ® 150[4] | 2.72 |
| Crystal oil K-30[5] | 8.74 |
| Flow-control agent Baysilon ® MA[6] | 1.20 |
| | 100.00g |

[1] Acrylate resin, Hoechst AG; 65% solution in xylene/butanol 26:9
[2] Acrylate resin, Hoechst AG; 75% solution in Solvesso ® 100[4]
[3] Melamin resin, Hoechst AG; 55% solution in isobutanol
[4] Manufacturer: ESSO
[5] Manufacturer: Shell
[6] 1% in Solvesso ® 150; manufacturer: Bayer AG 1% by weight of stabilizer is added to this varnish. In addition, 1.5% by weight of a benzotriazole UV absorber (UVA) are added to some samples. The amounts given are in each case based on the solids content of the varnish. The varnish is thinned with a 1:1 mixture of butyl acetate and xylene to give a sprayable material and is sprayed onto an aluminium sheet coated with a silver metallic base coat. The samples are then cured at 130° C. for 30 minutes, giving a varnish film thickness of 40–45 μm.

The samples prepared in this way are weathered in a UVCON® exposure instrument (Atlas Corp.) with a cycle of UV radiation at 60° C. for 4 hours and condensation at 50° C. for 4 hours.

After weathering for 400 hours, the 20° gloss for each of the samples is measured in accordance with DIN 67530, and at the same time the samples are examined for cracking. Table C2 shows the cracking data obtained after weathering for 4800 hours. The amount data are based on the solids content of the varnish.

TABLE C2

| Stabilizer | Weathering time (h) before cracking Cracking after |
|---|---|
| none | 1200 h |
| 1% of polymer from Ex. B2 + 1.5% of UVA* | 4800 h |
| 1% of polymer from Ex. B3 + 1.5% of UVA* | more than 4800 h |

UVA* = compound of the formula

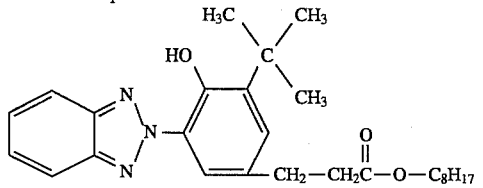

The samples containing the stabilizers according to the invention have excellent gloss retention; cracks only appear after a very long weathering time.

Example C3: Stabilization of a photographic material
0.087 g of the yellow coupler of the formula

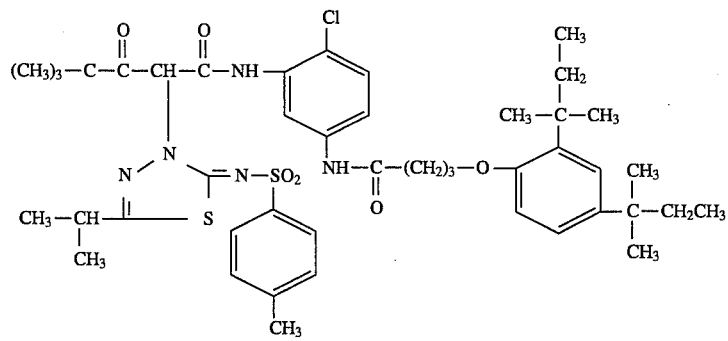

are dissolved in 2.0 ml of an ethyl acetate solution of the stabilizer according to the invention (2.25 g/100 ml). 9.0 ml of a 2.3% aqueous gelatin solution which has been adjusted to a pH of 6.5 and contains 1.744 g/l of the wetting agent of the formula

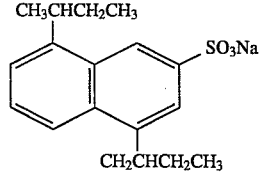

are added to 1.0 ml of this solution.

2 ml of a silver bromide emulsion having a silver content of 6.0 g/l and 1.0 ml of a 0.7% aqueous solution of the curing agent of the formula

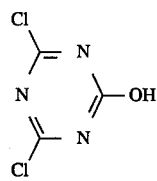

are added to 5.0 ml of the resultant coupler emulsion, and the mixture is poured onto a 13×18 cm plastic-coated paper.

After a curing time of 7 days, the samples are exposed with 125 Lux.s behind a silver step wedge and subsequently processed by the Kodak Ektaprint 2® process.

The yellow wedges obtained are irradiated with a total of 60 kJ/cm$^2$ in an Atlas Weather-O-Meter by means of a 2500 W xenon lamp behind a UV filter (Kodak 2C).

A sample without stabilizer is coated in the same way as standard.

The drop in colour density at the absorption maximum of the yellow dye, which occurs during irradiation, is measured using a Macbeth TR 924A densitometer.

The light stabilization effect is evident from the drop in colour density. The smaller the drop in density, the higher the light stabilization effectiveness. The stabilizers according to the invention have a good light stabilization action.

What is claimed is:

1. A polyether comprising 1–100 mol % of recurring units of the formula I

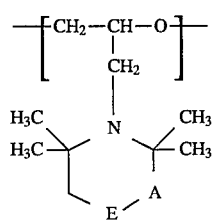

and 0–99 mol % of structural units selected from the group consisting of units of the formula II

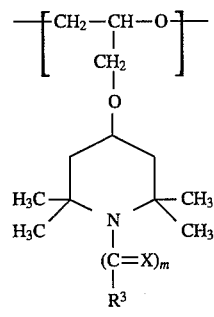

and units of of the formula III

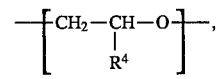

where the molecular weight $M_n$ of the homopolymer or copolymer, measured by gel permeation chromatography, is from 600 to 600,000 g/mol, and in which m is 0 or 1;

A is —CH$_2$— or —CO—;

when A is methylene, E is

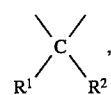

and when A is carbonyl, E is

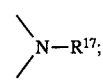

R$^1$ is hydrogen;

R$^2$ is hydrogen; —O—R$^5$; —S—R$^5$; or —N(R$^{13}$)R$^{14}$; or

R$^1$ and R$^2$ together are a =O substituent or together with the carbon atom to which they are bonded are a five- or six-membered ring of the formulae

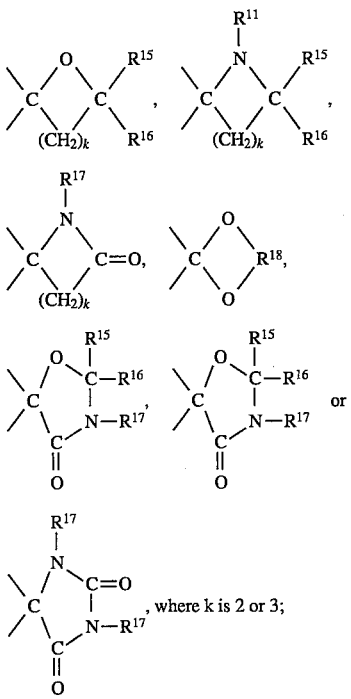

where k is 2 or 3;

R$^3$, in the case where m is 0 or 1, is C$_1$–C$_{36}$alkyl or C$_7$–C$_{36}$aralkyl, each of which is unsubstituted or substituted by C$_5$–C$_8$cycloalkyl and/or is interrupted in the aliphatic part by C$_5$–C$_8$cycloalkylene and/or in the aliphatic part by oxygen or sulfur or —NR$^{11}$— and/or is substituted in the aromatic part by 1 to 3 C$_1$–C$_4$alkyl or C$_1$–C$_4$alkoxy radicals;

C$_5$–C$_{12}$cycloalkyl which is unsubstituted or substituted by 1 to 4 C$_1$–C$_4$alkyl and/or C$_1$–C$_4$alkoxy radicals; C$_6$–C$_{10}$aryl which is unsubstituted or substituted by 1 to 4 C$_1$–C$_4$alkyl and/or C$_1$–C$_4$alkoxy radicals; and R$^3$, in the case where m is 0, can alternatively be hydrogen; C$_1$–C$_{36}$alkoxy or C$_7$–C$_{36}$aralkoxy, each of which is unsubstituted or substituted by C$_5$–C$_8$cycloalkyl and/or is interrupted in the aliphatic part by C$_5$–C$_8$cycloalkylene and/or in the aliphatic part by oxygen or sulfur or —NR$^{11}$— and/or is substituted in the aromatic part by 1 to 3 C$_1$–C$_4$alkyl or C$_1$–C$_4$alkoxy radicals; C$_5$–C$_{12}$cycloalkoxy which is unsubsdtuted or substituted by 1 to 4 C$_1$–C$_4$alkyl and/or C$_1$–C$_4$alkoxy radicals; or C$_6$–C$_{10}$aryloxy which is unsubstituted or substituted by 1 to 4 C$_1$–C$_4$alkyl and/or C$_1$–C$_4$alkoxy radicals;

R$^4$ is as defined below for R$^5$ or is —O—R$^5$, —CH$_2$—O—R$^5$ or hydrogen;

R$^5$ is C$_1$–C$_{50}$alkyl; or C$_2$–C$_{50}$alkyl which is interrupted by —O—, —S— and/or C$_5$–C$_8$cycloalkylene; or R$^5$ is C$_5$–C$_{12}$cycloalkyl which is unsubstituted or substituted by 1 to 4 —R$^{12}$; C$_6$–C$_{10}$aryl which is unsubstituted or substituted by 1 to 4 —R$^{12}$ or —OR$^{12}$; or C$_7$–C$_{50}$aralkyl which is unsubstituted or substituted by C$_5$–C$_8$cycloalkyl and/or is interrupted in the aliphatic part by C$_5$–C$_8$cycloalkylene and/or is interrupted in the aliphatic part by oxygen or sulfur and/or is substituted in the aromatic part by 1 to 4 —R$^{12}$ or —OR$^{12}$;

$R^{11}$ is $C_1$-$C_{18}$alkyl; $C_5$-$C_8$cycloalkyl; phenyl; naphthyl; $C_7$-$C_9$phenylalkyl; or $C_{11}$-$C_{14}$naphthylalkyl;

$R^{12}$ is $C_1$-$C_{18}$alkyl; $C_5$-$C_7$cycloalkyl; phenyl or benzyl;

$R^{13}$ and $R^{14}$, independently of one another, each have one of the meanings given for $R^5$; or $R^{13}$ and $R^{14}$, together with the nitrogen atom to which they are bonded, are cyclic imide of the formula

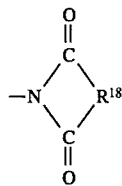

whose ring structure contains 4 to 6 carbon atoms;

$R^{15}$ and $R^{16}$, independently of one another, are H; or $C_1$-$C_{12}$alkyl; or together are straight-chain, α,ω-linked $C_4$-$C_{13}$alkylene;

$R^{17}$ has one of the meanings for $R^{11}$;

$R^{18}$ is $C_2$-$C_{18}$alkylene; and

X is an oxygen or sulfur atom.

2. A polyether according to claim 1, comprising from 20 to 100 mol % of recurring units of the formula I.

3. A polyether according to claim 1, in which $R^3$, in the case where m is 0, can alternatively be $C_1$-$C_{36}$alkoxy; $C_2$-$C_{36}$alkoxy which is interrupted by —O—; $C_7$-$C_{36}$aralkoxy; $C_7$-$C_{36}$aralkoxy which is interrupted in the aliphatic part by —O— and/or is substituted in the aromatic part by 1 to 3 $C_1$-$C_4$alkyl or $C_1$-$C_4$ alkoxy radicals; $C_5$-$C_9$cycloalkoxy which is unsubstituted or substituted by 1 to 3 $C_1$-$C_4$alkyl and/or $C_1$-$C_4$alkoxy radicals; or phenoxy which is unsubstituted or substituted by 1 to 4 $C_1$-$C_4$alkyl and/or $C_1$-$C_4$alkoxy radicals;

$R^5$ is $C_1$-$C_{50}$alkyl; $C_2$-$C_{50}$alkyl which is interrupted by —O—; $C_5$-$C_9$ cycloalkyl which is unsubstituted or substituted by —$R^{12}$; phenyl which is unsubstituted or substituted by 1 to 3 —$R^{12}$ or —$OR^2$; or $C_7$-$C_{50}$phenylalkyl which is unsubstituted or substituted in the aromatic part by 1 to 3 —$R^{12}$ or —$OR^{12}$ and/or is interrupted in the aliphatic part by —O—;

$R^{11}$ is $C_1$-$C_{18}$alkyl; $C_5$-$C_8$cycloalkyl; phenyl or $C_7$-$C_9$phenylalkyl; and X is an oxygen atom.

4. A polyether according to claim 3, in which

A is methylene and E is

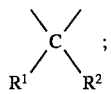

$R^1$ is hydrogen;

$R^2$ is —O—$R^5$;

$R^3$, in the case where m is 0 or 1, is $C_1$-$C_{18}$alkyl or $C_7$-$C_{18}$phenylalkyl, each of which is unsubstituted or substituted on the phenyl ring by 1 to 3 $C_1$-$C_4$alkyl radicals;

$C_5$-$C_9$cycloalkyl; or phenyl which is unsubstituted or substituted by 1 to 3 $C_1$-$C_4$alkyl radicals; and $R^3$, in the case where m is 0, can alternatively be $C_4$-$C_{36}$alkoxy or $C_7$-$C_{18}$phenylalkoxy, each of which is unsubstituted or substituted on the phenyl ring by 1 to 3 $C_1$-$C_4$alkyl radicals; $C_5$-$C_9$cycloalkoxy; or phenoxy which is unsubstituted or substituted by 1 to 3 $C_1$-$C_4$alkyl radicals; and $R^5$ is $C_6$-$C_{36}$alkyl; $C_6$-$C_{36}$alkyl which is interrupted by —O—; $C_5$-$C_9$ cycloalkyl; phenyl; $C_7$-$C_{36}$phenylalkyl; or $C_7$-$C_{36}$phenylalkyl which is interrupted in the aliphatic part by —O—.

5. A polyether according to claim 4, in which m is 0; and $R^5$ is $C_6$-$C_{18}$alkyl; $C_5$-$C_9$cycloalkyl; phenyl; or $C_7$-$C_9$phenylalkyl.

6. A polyether according to claim 5, consisting of recurring units of the formula I.

* * * * *